(12) United States Patent
Bernard et al.

(10) Patent No.: US 9,551,391 B2
(45) Date of Patent: Jan. 24, 2017

(54) LOCK-EQUIPPED MEMBER FOR GUIDING A DISC BRAKE PAD AND DISC BRAKE PROVIDED WITH SUCH GUIDING MEMBERS

(71) Applicant: Robert Bosch GmbH, Stuttgart (DE)

(72) Inventors: Simon Bernard, Le Perreux s/Marne (FR); Sandra Merrien, Fontenay sous Bois (FR); Roger Mahoudeaux, Le Blanc Mesnil (FR)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 14/357,005

(22) PCT Filed: Dec. 14, 2012

(86) PCT No.: PCT/EP2012/075578
§ 371 (c)(1),
(2) Date: May 8, 2014

(87) PCT Pub. No.: WO2013/087854
PCT Pub. Date: Jun. 20, 2013

(65) Prior Publication Data
US 2014/0291083 A1    Oct. 2, 2014

(30) Foreign Application Priority Data
Dec. 15, 2011    (FR) .................................... 11 03873

(51) Int. Cl.
*F16D 65/38*    (2006.01)
*F16D 65/097*    (2006.01)
(Continued)

(52) U.S. Cl.
CPC ....... *F16D 65/0977* (2013.01); *F16D 55/2262* (2013.01); *F16D 65/0972* (2013.01)

(58) Field of Classification Search
CPC ................... F16D 2055/0008; F16D 65/0972; F16D 65/0977; F16D 65/0978; F16D 55/2262
(Continued)

(56) References Cited

U.S. PATENT DOCUMENTS 4,180,148 A     12/1979  Souma
5,699,882 A  *  12/1997  Ikegami .............. F16D 65/0972
                                                      188/205 A (Continued)

FOREIGN PATENT DOCUMENTS

CN          1690465 A     11/2005
CN        101063470 A     10/2007
(Continued)

OTHER PUBLICATIONS

International Search Report corresponding to PCT Application No. PCT/EP2012/075578, mailed Apr. 8, 2013 (French and English language document) (5 pages).

*Primary Examiner* — Melody Burch
(74) *Attorney, Agent, or Firm* — Maginot, Moore & Beck LLP

(57) ABSTRACT

A brake calliper has two arms, where each arm includes a housing and a stub. A member for guiding a disc brake pad is disposed in the housing, and is secured by lugs to a front of the stub. The member includes a body having a U-shaped section formed by an inner radial surface, a base, and an outer radial surface. An inner side of the body is bordered by an inner supporting surface located on an inner surface of the arms, and an outer supporting surface of the body is disposed against a front of the stud. The out supporting surface extends into a supporting surface toward the front of the stud. The body further includes a locking tongue that extends beyond an edge of the body, and is configured to be hooked in the housing.

8 Claims, 1 Drawing Sheet

(51) Int. Cl.
*F16D 55/226* (2006.01)
*F16D 55/00* (2006.01)

(58) Field of Classification Search
USPC ......... 188/73.31, 73.35, 73.36, 73.37, 73.39, 188/250 E, 250 F, 250 G, 234
See application file for complete search history.

(56) References Cited

U.S. PATENT DOCUMENTS

| | | | |
|---|---|---|---|
| 6,223,866 B1 * | 5/2001 | Giacomazza | F16D 55/227 188/73.36 |
| 6,296,085 B1 * | 10/2001 | Yukoku | F16D 65/0972 188/73.36 |
| 7,766,131 B2 * | 8/2010 | Hayashi | F16D 65/0972 188/73.37 |
| 2007/0170019 A1 | 7/2007 | Rockwell et al. | |
| 2007/0251772 A1 * | 11/2007 | Tsurumi | F16D 65/095 188/73.38 |
| 2011/0168503 A1 * | 7/2011 | Chelaidite | F16D 65/0972 188/73.31 |
| 2014/0305754 A1 * | 10/2014 | Bernard | F16D 65/0972 188/250 E |

FOREIGN PATENT DOCUMENTS

| | | |
|---|---|---|
| DE | 199 56 968 A1 | 5/2000 |
| EP | 1 375 952 A2 | 1/2004 |
| EP | 1 591 689 A1 | 11/2005 |
| FR | 2 904 990 A1 | 2/2008 |
| FR | 2 925 634 A1 | 6/2009 |
| JP | 8-261260 A | 10/1996 |
| WO | 01/31223 A1 | 5/2001 |

* cited by examiner

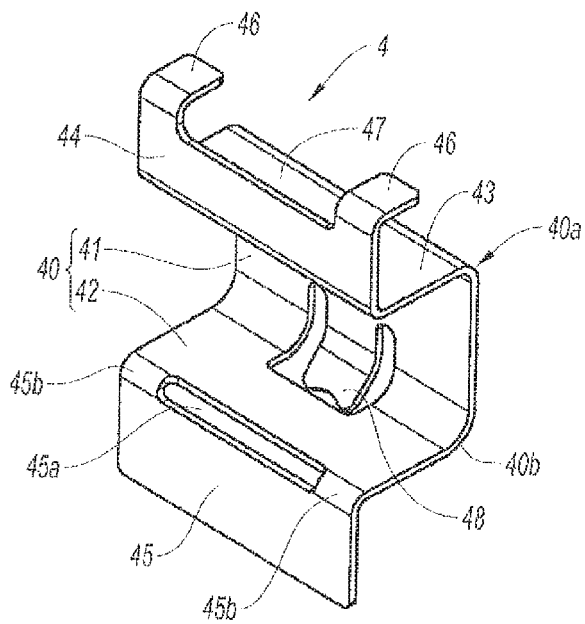
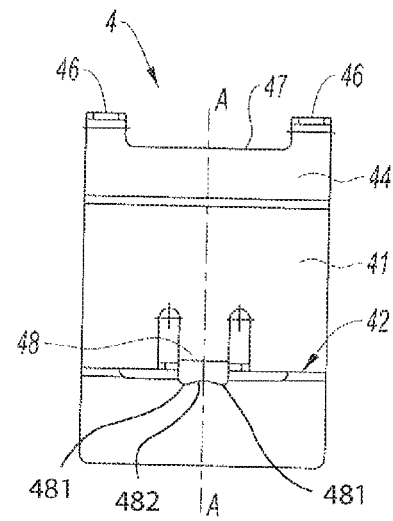
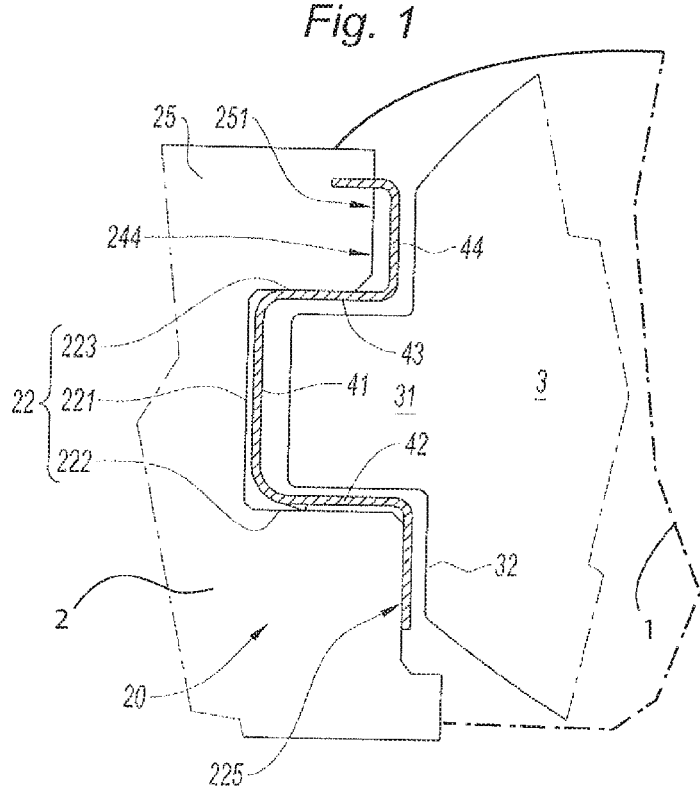
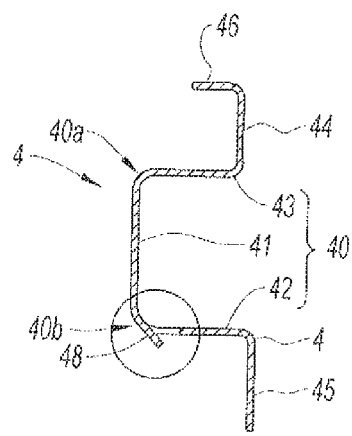
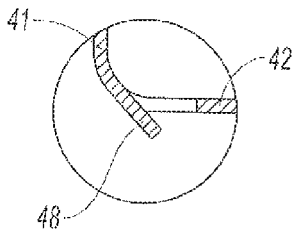
Fig. 1
Fig. 2
Fig. 3
Fig. 3A
Fig. 4

US 9,551,391 B2

LOCK-EQUIPPED MEMBER FOR GUIDING A DISC BRAKE PAD AND DISC BRAKE PROVIDED WITH SUCH GUIDING MEMBERS

This application is a 35 U.S.C. §371 National Stage Application of PCT/EP2012/075578, filed on Dec. 14, 2012, which claims the benefit of priority to Ser. No. FR 1103873, filed on Dec. 15, 2011 in France, the disclosures of which are incorporated herein by reference in their entirety.

The present disclosure relates to a guiding member for a disk brake pad in a cap which is composed of two arms connected by two bars, each arm having at the two ends thereof an axial housing which has a substantially rectangular cross section and which has a base, a lower surface and an upper surface, the housing being surmounted by a stud, the guiding member being formed by a spring steel band which is folded in order to be fixed to the stud and in the housing of the arm and to receive in an axially sliding manner the corresponding lug of the pad, in order to guide it and to press it into the housing.

Such a guiding member of a brake pad in the housing of a cap of a disk brake makes it easier to displace the brake pad during braking, preventing the noise often produced at this time.

The disclosure also relates to a disk brake provided with such assembly members according to the disclosure.

BACKGROUND

In a vehicle provided with disk brakes, each wheel to be braked comprises a brake disk which is fixedly joined to the wheel and brake pads which are fixedly joined to the chassis of the vehicle and which brake the disk by friction. The brake comprises a calliper having a cap having at each side of the brake disk a U-like branch which carries a brake pad and each pad is movable perpendicularly relative to the plane of the disk, in a state guided by the two ends (lugs) thereof in the housings of the arms of the cap.

During braking, the pads are moved in the direction tangential to the disk and the lugs move into abutment, sometimes abruptly, against the bottom of their guiding housing, bringing about a noise referred to as a "clonk" or tapping. In order to damp the impact of the lugs in their housing and thereby to attenuate the noise, there is provided a spring between each lug and the housing thereof and the damping is obtained by the deformation of the spring whose shape is adapted to the force applied by the brake pad during its tangential displacement.

Furthermore, the pad must be able to move axially by its lugs sliding in the retention spring which combines a function as a slide and a function as a spring.

Once the pad is in position, the slide system becomes deformed as a result of the geometric defects and the spring effect and brings about a spring/rigidity effect which has an influence on the generation of noise during the braking.

Such guiding members for pads of disk brakes are already known according to the documents WO 01/31223 and FR 07 09 124.

An object of the present disclosure is to improve such guiding members for disk brakes in order to improve their efficiency.

SUMMARY

To this end, the disclosure relates to a guiding member of the type defined above, characterized by
- a body which has a cross section in the form of a U on its side and which is substantially rectangular in order to be positioned in the housing having an external radial surface which moves into abutment against the upper surface of the housing, followed by a base which moves into abutment against the base of the housing and an internal radial surface, and which is continued by
- an external abutment surface which moves into abutment against the front face of the stud and which carries two tongues in order to form lateral stops which extend at one side and the other of the stud and by
- an internal abutment surface which moves into abutment against the front internal surface of the arm and which receives the front lower face of the pad under the lug, the internal radial surface is provided with a locking tongue in order to press against and become engaged in the lower surface of the housing.

The guiding member according to the disclosure is excellently fixed to the arm of the cap both by being retained on the stud and by being engaged by means of the locking tongue in the housing of the arm. The U-like form of the body of the guiding member provides good guiding contact for the auxiliary spring or radial spring with which each lug of the pad is provided and which promotes not only the sensitivity of the braking movement.

The raising of the internal radial surface relative to the lower surface of the housing as a result of the locking tongue moving into abutment brings about a spring effect which raises the body of the guiding member and presses it against the upper surface of the housing. That pressing action is also the pressing action of the lug of the pad. Any play in this region is thereby resiliently reduced.

According to another advantageous feature, the locking tongue is cut in a straddling manner at the bent corner at the junction of the base and the internal radial surface in order to naturally project from the cutout thereof. This embodiment of the locking tongue allows the internal radial surface of the guiding member to benefit from the resilience brought about by the bending of the lower corner of the body.

According to another particularly advantageous feature, the locking tongue projects in accordance with an angle in the order of 45° relative to the internal radial surface.

The equilibrium of the guiding member is ensured particularly in that the locking tongue is cut and deformed resiliently in the base and in the internal radial surface of the body, substantially at the center of the axial length of the band forming the guiding member and in the region of the bent corner between the base and the internal radial surface.

The engagement of the locking tongue is improved in that the locking tongue has an edge formed by two rounded portions at one side and the other of an inwardly curved portion.

According to another advantageous feature, the two lateral stops are constituted by tongues cut from the external front abutment surface with a great cutting radius and a bend forming a fold.

According to another advantageous feature, the folding edge between the internal radial surface of the body and the internal abutment surface comprises a longitudinal cutout over a large portion of the axial length thereof, allowing the material to remain at the ends forming folded attachments.

As a result of this connection between the internal radial surface and the internal abutment surface, the connection does not have any spring-like characteristic so that the internal abutment surface is firmly pressed against the surface of the cap beyond the housing.

The disclosure also relates to a disk brake provided with guiding members as defined above.

BRIEF DECRIPTION OF THE DRAWINGS

The present disclosure will be described in greater detail below with reference to an embodiment of a guiding member of a disk brake pad according to the disclosure illustrated in the appended drawings, in which:

FIG. 1 is an isometric view of the guiding member according to the disclosure,

FIG. 2 is a side view of the member of FIG. 1,

FIG. 3 is a sectional view along A-A of the spring of FIG. 2,

FIG. 3A is a view of the detail D of FIG. 3,

FIG. 4 is a side view of a portion of an arm of a cap of a disk brake provided with a guiding member and a brake pad.

DETAILED DESCRIPTION

FIG. 1 shows a guiding member 4 according to the disclosure in a non-installed position and the description makes use of the orientation conventions defined with reference to FIG. 4 by the notions "radial", "internal", "external", "lower" and "upper".

The guiding member 4 is obtained by shaping a band of spring steel. It comprises a body 40 in the form of a U on its side, having a substantially rectangular cross section with bent corners 40a, 40b, comprising a base 41 which continues at one side downward by way of an internal radial surface 42 and, at the other side, by way of an external radial surface 43. That surface continues as an external abutment surface 44 which is bounded above and at each side by a lateral abutment tongue 46 which is directed toward the rear. The two abutment tongues 46 are separated by a cutout 47 with at each side a very rounded angle in order to conserve the entire rigidity in the abutment tongues 46 and for their connection with respect to the surface 44.

An internal abutment surface 45 is connected to the internal radial surface 42 by a fold with a cutout 45a over a large portion of the length thereof, which allows only two bent attachments 45b at the two ends to remain.

The internal radial surface 42 and the base 41 are provided with a locking tongue 48 which is cut out of the mass substantially at the center of the axial length of the guiding member 4 so as to straddle the corner 40b. This locking tongue 48 extends beyond the internal radial surface 42 in a downward direction (in accordance with the orientation of FIG. 1) in order to constitute an engagement member which grips the lower surface 222 of the housing 22 (see FIG. 4).

In order to promote this engagement, the front edge of the locking tongue 48 comprises two rounded portions 481 which protrude and which are separated by a recessed curved portion 482.

FIG. 2 is a rear side view of the guiding member 4 of FIG. 1 showing the arrangement of the two lateral abutment tongues 46, the shape of the locking tongue 48 and the cutout thereof from the base 41 and the internal radial surface 42 in such a manner as to allow the locking tongue 48 to fully deploy its resilience in order to become engaged in the housing 22 and to retain the guiding member 4 at that location by locking.

FIG. 3 is a cross section of the guiding member 4 and the different component parts thereof, showing the rectangular shape of the body 40 and the connection of the internal radial surface 42 at right angles to the base 41 of the body by the bend 40b.

The cross section of FIG. 3A taken through the guiding member 4 in the region of the bend 40b of the base 41 emphasises the protruding shape of the tongue 48 which acts as an engagement surface. The tongue 48 defines, with the surface 42, an angle a in the order of from 30° to 50° and in particular in the order of 45°.

The bend of the fold of the tongues 46, the bend of the fold between the surfaces 43 and 44 or the bend between the surfaces 41 and 43 is produced with a radius of curvature which is very small, whilst the connection between the base 41 and the surface 42 is carried out with a bend having a radius of curvature which is relatively large in order to confer resilience and mobility on the internal radial surface 42 when the lug 31 of the pad presses against the surface 42 because, since the tongue 48 projects, the surface 42 is necessarily at least locally above the lower surface 222.

FIG. 4 is a side view, drawn to an enlarged scale, of the arrangement of the lug 31 of the pad 3, which lug moves into the axial housing 22 of the end of the arm 20 of the cap 2. The housing 22 is bounded by a lower radial surface 222, a base 221 and an upper surface 223. The upper surface 223 is part of a stud 25 to which the guiding member 4 is fixed. The housing of the other arm which is not illustrated is also provided with a guiding member 4. This figure emphasises the positioning of the guiding member 4 with its front abutment surface 44 moving into abutment against the front surface 251 of the stud 25 and the two lateral abutment tongues 46 extending at one side and the other of the stud 25; the internal abutment surface 45 moves into abutment against the internal front surface 225 of the arm 20 under the lug 31.

The function of the guiding springs 4 is to guide the pad for the braking and the return thereof to a position out of contact with the brake disk and to damp the impact of the lugs against the base of each housing 22 when the pads 3 are carried by the disk 1 during a braking operation. The damping of the impact results from the deformation of the guiding members 4 under the force applied by the pads 3.

The lugs 31 at the two ends of the pad 3 slide axially in the guiding springs 4, that is to say, perpendicularly relative to the plane of FIG. 1. A radial spring (not illustrated) may be interposed between the lug 31 and the body 40 of the member 4.

In a general manner, the brake disk 1 is straddled by a cap composed of two arms 20 which are connected by two bars. Those two arms 20 extend at one side and the other of the disk 1 and each carry a brake pad. The brake pads 3 are provided at the ends thereof with lugs 31 for their assembly in housings 22 of each arm, by means of a guiding spring 4 with which each housing 22 is provided.

FIG. 4 illustrates in detail the orientation of the elements of the spring 4 and the housing 22.

The base 221 has a generally radial orientation, that is to say, extending through the axis of the brake disk and the lower surface 222 is nearer the axis of the brake disk than the upper surface 223. The term "internal" is synonymous with the term "lower" and the term "external" is synonymous with the term "upper".

The disclosure thereby generally relates to disk brakes and automotive equipment.

LIST OF REFERENCE NUMERALS

| | |
|---|---|
| 1 | disk |
| 2 | cap |
| 20 | U-like arm |
| 21 | bar |
| 22 | housing |
| 221 | base |
| 222 | lower surface |
| 223 | upper surface |
| 224 | external front surface |
| 225 | internal front surface |
| 25 | stud |
| 251 | front surface of stud |
| 3 | pad |
| 31 | lug |
| 32 | lower front face |
| 4 | guiding member |
| 40 | body |
| 40a, b | corners/bends |
| 41 | base |
| 42 | internal radial surface |
| 43 | external radial surface |
| 44 | external abutment surface |
| 45 | internal abutment surface |
| 45a | longitudinal cutout |
| 45b | folded attachment |
| 46 | lateral tongue |
| 47 | cutout |
| 48 | locking tongue |
| 481 | rounded portion |
| 482 | inwardly curved portion |

The invention claimed is:

1. A guiding member for a disk brake pad in a cap that has at least one arm, the at least one arm having at respective two ends thereof an axial housing which has a substantially rectangular cross section and which has a base, a lower surface and an upper surface, the housing being surmounted by a stud, the guiding member comprising:
   a body which has a substantially U-shaped cross section that is substantially rectangular, such that the body is configured to be positioned in the housing;
   an external radial surface configured to abut the upper surface of the housing;
   a base that abuts the base of the housing;
   an internal radial surface that includes a locking tongue configured to press against and engage the lower surface of the housing;
   an external abutment surface configured to abut a front face of the stud;
   two tongues extending directly from the external abutment surface and configured to form lateral stops which extend on each side of the stud along an axial direction, the locking tongue located between the two tongues along the axial direction; and
   an internal abutment surface that abuts a front internal surface of the at least one arm, and which is configured to receive a front lower surface of the disk brake pad under a corresponding lug of the disk brake pad;
   wherein the guiding member is formed by a folded spring steel band that is configured to be fixed to the stud; and
   wherein the guiding member is further configured to:
      receive in an axially sliding manner the corresponding lug of the disk brake pad and;
      guide and press the corresponding lug into the housing.

2. The guiding member as claimed in claim 1, wherein the locking tongue is formed by a cut in a straddling manner at a bent corner at a junction of the base of the guiding member and the internal radial surface such that the locking tongue projects from the cut.

3. The guiding member as claimed in claim 2, wherein the locking tongue projects in an angle of 45° relative to the internal radial surface.

4. The guiding member as claimed in claim 1, wherein the two lateral stops are formed by the two tongues cut from the external abutment surface with a cutting radius and a bend forming a fold.

5. The guiding member as claimed in claim 1, wherein the locking tongue is formed by a cut such that the locking tongue is resiliently deformed from the base of the guiding member and from the internal radial surface of the body, substantially at a center of an axial length of the folded spring steel band forming the guiding member and in a region of a bent corner between the base and the internal radial surface.

6. The guiding member as claimed in claim 1, wherein the locking tongue has an edge which is formed by two rounded portions at each side of an inwardly curved portion.

7. The guiding member as claimed in claim 2, wherein:
   a folding edge between the internal radial surface of the body and the internal abutment surface comprises a longitudinal cutout over an axial length thereof, such that material at ends of the longitudinal cutout form folded attachments, and
   the longitudinal cutout is spaced apart from the cut forming the locking tongue.

8. A disk brake comprising:
   a cap that includes at least one arm, the at least one arm having a respective axial housing at each end, wherein the respective axial housing has a substantially rectangular cross section, a base, a lower surface, and an upper surface, and wherein the respective axial housing is surmounted by a stud;
   at least one disk brake pad; and
   guiding members of the at least one disk brake pad that respectively include:
      a body which has a substantially U-shaped cross section that is substantially rectangular, such that the body is received in the respective axial housing;
      an external radial surface that abuts the upper surface of the respective axial housing;
      a base that abuts the base of the respective axial housing;
      an internal radial surface that includes a locking tongue configured to press against and engage the lower surface of the respective axial housing;
      an external abutment surface that abuts a front face of the stud of the respective axial housing;
      two tongues extending directly from the external abutment surface, the two tongues configured to form lateral stops which extend on each side of the stud along an axial direction, the locking tongue located between the two tongues along the axial direction; and
      an internal abutment surface that abuts a front internal surface of the at least one arm, and which receives a front lower surface of the at least one disk brake pad under a corresponding lug of the at least one disk brake pad;
   wherein each guiding member is formed by a folded spring steel band, and is fixed to the stud of the respective axial housing; and wherein the guiding member is further configured to:
  receive in an axially sliding manner the corresponding lug of the at least one disk brake pad and;
  guide and press the corresponding lug into the respective axial housing.

* * * * *